Figure 2:
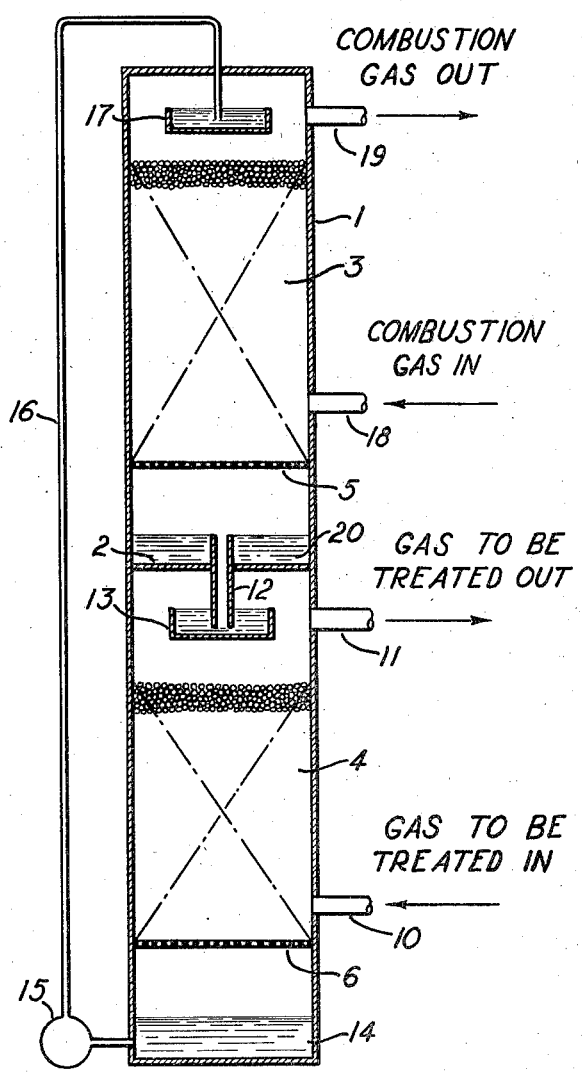

April 30, 1946. A. J. ABRAMS 2,399,532
TEMPERATURE CONTROL IN REGENERATION OF CONTACT MASSES
Filed Oct. 11, 1943

Armand J. Abrams
INVENTOR
BY Sidney A. Johnson
ATTORNEY

Patented Apr. 30, 1946

2,399,532

UNITED STATES PATENT OFFICE 2,399,532

TEMPERATURE CONTROL IN REGENERATION OF CONTACT MASSES

Armand J. Abrams, Dallas, Tex., assignor, by mesne assignments, to Socony-Vacuum Oil Company, Incorporated, New York, N. Y., a corporation of New York Application October 11, 1943, Serial No. 505,797

2 Claims. (Cl. 252—242)

This invention relates to the conversion of organic compounds in the presence of contact masses. Numerous processes have been proposed for the conversion of organic compounds while in the vapor phase by pyrogenic reactions in the presence of contact masses, which may or may not exert a catalytic effect upon the desired reaction. Typical of such processes are the thermal or catalytic cracking of heavy hydrocarbons to gasoline boiling hydrocarbons; the reforming of hydrocarbons; alkylation of olefins or alcohols with aromatic compounds such as benzene, toluene, phenol and the like, or with isoparaffins; the dehydrogenation of paraffins, alkyl aromatics and the like; the cyclization of paraffin hydrocarbons to aromatic compounds; and the like. The invention relates broadly to an improved process for carrying out pyrogenic reactions of organic vapors of this general type.

This application is a continuation-in-part of my copending application Serial Number 416,017, filed October 22, 1941 now U. S. Patent 2,354,354 issued July 25, 1944, intitled Hydrocarbon conversion.

More particularly the invention is concerned with the conversion of the vapors of organic compounds, particularly hydrocarbons, wherein heat is conveyed to or carried away from the vapors by a liquid heat exchange medium in a novel and efficient manner and in a manner that is practical over a very wide range of temperatures thereby making the process applicable to all vapor phase conversion processes including high temperature conversion processes for the light hydrocarbon gases.

For convenience in describing the mode of operation of the process of this invention it will be particularly described in connection with the conversion of hydrocarbon vapors, either thermally or catalytically.

The art is replete with processes for the thermal conversion of hydrocarbons. Most of these prior art methods involve transfer of heat through a confining wall of the hydrocarbons. Such indirect heat exchange methods are subject to a practical limitation on their upper temperature and, therefore, in order to convert methane in this manner to valuable products would require very expensive equipment of limited life, as the refractory tube furnace involved in this operation would have to be exposed to a much higher temperature than that required by and which would reach the confined methane. On the other hand, methods have been proposed for directly contacting hydrocarbons with a heat transfer agent. This type operation has shown up in embodiments where the hydrocarbons are brought into direct contact with vapors of metals or other suitable inorganic substances, or where the hydrocarbon vapors have been bubbled through a liquid body of the heat transfer agent. It is apparent that where vapors of metals or other inorganic substances are used as a direct heat exchange agent, that the range of materials which may be used for the treatment of the lighter hydrocarbons is rather limited and that the conditions for recovery of the agent are not very favorable. Processes which use a liquid body of the heat transfer agent for direct heating of vapors passed therethrough do not seem to have made much impression on the art. A serious drawback to such methods is the carbon accumulation in the heat transfer agent. Furthermore, apparatus and operation requirements for forcing the hydrocarbons through the body of liquid are usually objectionable. Again, as these processes have been conceived heretofore, the heat transfer agent itself is usually heated by indirect means, thereby somewhat restricting their range of usefulness. None of these processes are known that have been applied successfully to the conversion of the lighter hydrocarbons such as methane, ethane and propane.

Therefore, it is an object of this invention to provide a process for the conversion of organic vapors in the presence of contact bodies, which provides adequate temperature control and which is capable of doing this over a very wide range of temperature, thereby making the process applicable for substantially any elevated temperature conversion process.

Another object is to afford a process for directly contacting the organic vapors with a liquid heat exchange medium which makes adequate provision for the removal or disposal of carbon.

The above objects and other objects will be apparent from the following description of my invention.

According to the preferred embodiment of my invention, the hydrocarbons, or other organic compounds, are passed in the gaseous phase through a packed conversion zone in direct contact with a liquid heat exchange medium which flows through the zone under non-flooding conditions. The packing or contact mass in the zone, which may be inert or catalytically active for the reaction being carried out, is not appreciably wetted by the heat transfer agent and serves merely to spread the agent into films which provide large surface areas for contact with the hydrocarbons. In this manner I provide better heat transfer than when hydrocarbons are passed through a flooded tower, i. e., a tower wherein all the voids are flooded with the liquid heat exchange medium. Moreover, it is much easier to pass the proper amount of hydrocarbon vapors through my non-flooded tower.

My invention involves the further principle that the liquid heat transfer agent is brought into direct contact with at least a second fluid agent after leaving the conversion zone in order to recondition its physical characteristics so that it is again ready to be used in the conversion zone. This second agent may remove carbon from the heat transfer agent or it may regulate the temperature of the heat transfer agent for reuse in the conversion process or it may do both.

Therefore, perhaps, one of the simplest embodiments of my invention comprises a system in which a liquid heat exchange medium flows in a cycle through a packed conversion zone under non-flooding conditions in direct contact with hydrocarbon vapors or gases which are converted therein, then the liquid medium flows through an external circuit in which the agent is brought into direct contact with a combustion-supporting gas under combustion conditions whereby carbon is removed from the agent and its proper heat content is restored, and then the agent passes again to the conversion zone to complete the cycle. It will be understood that if the heat furnished by the combustion step is not sufficient, additional heat may be added to the liquid heat transfer agent in suitable manner prior to its return to the conversion zone.

In order to attain proper temperatures and for economic reasons, it is necessary to use, as the liquid heat exchange medium, a material which can have carbon removed from it by combustion. The removal of carbon is therefore effected by passing a preferably hot, combustion-supporting gas, through the liquid heat exchange medium subsequent to its use in, and removal from, the packed reaction zone. By suitable regulation of the temperature of the combustion-supporting gases, a ready variable is available for controlling the heat input to or the heat taken from the liquid heat exchange medium and consequently the temperature of the heat exchange medium may be brought to the desired level for recirculation.

Another advantage of the invention is that a direct flame furnace may be used to bring the liquid heat exchange medium up to the desired temperature, since it is oxygen-insensitive. The economy in operation and in furnace construction afforded by this advantage is obvious, particularly where a high temperature reaction is involved and the heat furnished by the oxidation of the carbon carried out from the reaction zone along with the heat exchange medium is insufficient to reheat the medium to the desired level. This is especially advantageous in those reactions in which little if any carbonaceous residue is formed in the reaction zone as for example in the dehydration of alcohols, the thermal conversion of acetone to ketene, or the dehydrogenation of cyclohexanol to cyclohexanone or phenol.

Although my invention is of particular utility for the supplying of heat to contact masses and reactants in the carrying out of endothermic reactions it is to be understood that the practices of the invention are equally applicable to the carrying out of organic reactions of an exothermic nature where it is desirable to maintain a uniform and controlled reaction temperature gradient in the reaction zone. Also since the heat transfer mediums used are oxygen-insensitive, this process for heat control may be utilized with such exothermic oxidation reactions as the oxidation of naphthalene to phthalic anhydride or the oxidation of cyclohexanol to adipic acid.

It should be obvious, therefore, that merely by a proper choice of heat transfer agents from the vast number of oxygen-insensitive materials available of diverse melting and boiling points, my process may be applied with ease to a wide variety of organic reactions at almost any elevated temperature range.

My process is of particular utility in connection with organic reactions carried out at temperatures above about 350° C. and especially for reactions carried out at temperatures above 450° C. up to as high as 1000° C. or higher. In fact the higher the temperature level at which it is sought to take away heat from or add heat to the contact bed, the greater becomes the advantage of my process over the processes of the prior art. In addition to being oxygen-insensitive, a second requirement of the liquid heat transfer medium used in the process, is that it must be liquid at the reaction temperature involved and it must have a relatively low vapor pressure at this temperature. In other words the melting point must be safely below the minimum temperature, and the boiling point (or decomposition point) considerably above the temperature range through which the heat transfer medium passes in its use of my process.

Since the heat transfer medium is oxygen-insensitive, its use to carry away heat from the contact mass during regeneration is also contemplated, and represents an important advantage of the process. As is well known considerable quantities of carbonaceous residues are formed through side reactions occurring during high temperature organic conversion reactions. While the liquid heat transfer medium aids in removing much of this material continuously as it is formed, nevertheless there will be a gradual accumulation of this material on the contact mass. Periodically it is therefore necessary to stop the reaction, and blow an oxidizing gas through the packing to oxidize this carbonaceous deposit. In order to control the temperature to a reasonable and uniform figure during this regeneration, the flow of heat transfer medium should be continued. During this regeneration, at least while the rate of oxidation is high, the function of the heat transfer medium will be to take heat away from rather than impart heat to the contact mass. The heat picked up by the heat transfer medium may be removed from it by blowing cool gases therethrough or any other suitable method. While this regeneration of the contact mass is particularly important with catalytically active masses, to keep up the activity of the catalyst and to prevent overheating and consequent inactivation of the contact catalyst, it is also of utility with inert contact masses even though the temperature requirements are not as rigid.

I have found that melts of inorganic salts are suitable for use as the liquid heat transfer medium. In so far as I am aware there is no salt or salt mixture of universal utility for all temperatures within the range in which my process finds utility, and which can be satisfactorily used with all types of catalytically active or inert packing materials. One salt that I have found suitable is cuprous chloride which melts at about 420° C., and is resistant to oxidation at temperatures above 450° C. At temperatures below 450° C., cuprous chloride will pick up some oxygen, but the reaction is reversible by heating to 450° C. or above, and therefore a limited amount of contact with oxidizing gases may be permitted at lower temperatures. The melting point of the salt may be reduced by the addition of alkali metal chloride in small amounts. Large amounts of the alkali metal chlorides cause the melting point to rise again to values above 420° C., but also serve to lower the vapor pressure and increase the temperature range over which the salt mixture may be used without excessive volatilization. A mixture of about equal parts of the chlorides of lithium, potassium and barium is very satisfactory for low temperature reactions also, and, depending upon the exact proportions, will be molten at temperatures as low as 350° C. Salt melts having somewhat higher melting points and lower vapor pressures may be obtained by using the sulphates. A particularly useful sulphate mixture is one containing about 50% of lithium sulphate and the balance approximately equal parts of the sulphates of sodium and manganese, which has a melting point of about 470° C. Mixed sulphates and chlorides may also be used. For example a melt containing about 60% lithium sulphate, 20% potassium chloride and 20% potassium sulphate, melting at 485° C. has desirable characteristics for many reactions conducted within a temperature range of from 525° C. to about 700° C. For high temperature reactions mixed fluorides, such as a mixture of sodium and aluminum fluorides having a melting point as low as 725° C., or mixtures containing lithium fluoride, are useful.

Where the contact masses within the tower are catalytically active, a salt melt should be chosen having a minimum of wetting action upon the catalyst mass, consistent with the other requirements. The amount of wetting between a given contact mass and salt melt depends, of course, upon the nature of the mass, the type of salt melt and the temperature. Since the variety of materials that may be desirable for use as contact masses is great, each contact mass should be empirically tested with a variety of oxidation resistant salt melts having the necessary melting and vapor pressure characteristics until minimum wetting of the contact material is found.

For the purpose of illustrating the invention more fully, reference is now made to the accompanying drawing which shows preferred embodiments in a diagrammatic form of suitable apparatus for carrying out the present invention.

Figure 1:
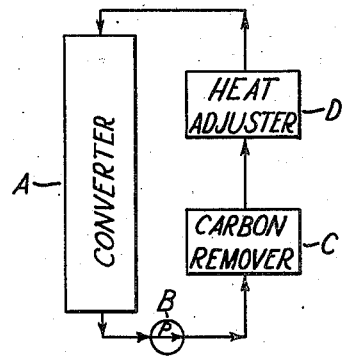

Referring to Figure 1, there is shown essentially a flow diagram of my system. Thus, the direct heat exchange medium flows under nonflooding conditions through the conversion case A in direct contact with the organic vapors which are thereby converted. The heat transfer agent then is circulated by pump B through carbon remover C, heat adjuster D and back to conversion case A. As explained hereinbefore, carbon remover C and heat adjuster D may be one and the same unit where carbon is removed from the heat transfer agent by contact with hot, combustion-supporting gases.

Turning now to Figure 2, there is disclosed an apparatus suitable for carrying out a preferred form of my invention utilizing a tower 1, subdivided by the plate 2, into the two packed sections 3 and 4. The packings in these sections are supported on the grates or screens 5 and 6, respectively. The packing material or contact masses in the sections 3 and 4 may be of any kind such as ceramic shapes, Raschig rings of ceramic or metallic nature, clay, activated clay, bauxite, Activated Alumina, or the like, appropriate for the purpose of spreading and, in general, promoting of better physical contact between reactant, heat transfer agent and contact bodies.

Organic vapors to be reacted are introduced through pipe 10, and after their passage through the packing in section 4, wherein the conversion desired is accomplished, the products of conversion depart through pipe 11. The vapors are, of course, at or near the temperature for the desired reaction when introduced at 10. Heat control of the reaction is accomplished by physically contacting the vapors while in the contact mass with the liquid heat transfer medium, which is introduced by pipe 12 into distributor 13 and flows down through contact mass in section 4 into pool 14 at the bottom of tower 1. Control of the temperature of this heat transfer medium is accomplished in a manner later described.

It has been discovered that the heat transfer medium removes from the conversion zone, where it is in direct contact with the hydrocarbons being converted, a large proportion of the cokey and solid carbonaceous side products and therein lies a major advantage of the process.

The heat transfer medium is then removed from the pool 14 by pump 15 and sent through line 16 to the top of the tower 1. Here the melt is introduced through spreader 17 into the contact mass in the upper packed section 3. Since any reaction occurring in this section is one of simple combustion the packing need have no catalytic action and metallic or ceramic shapes, such as metal or ceramic Raschig rings, are adequate for the purpose of promoting better physical contact between the melt, contaminated with carbonaceous residue, and the combustion-supporting gas. The combustion-supporting gas is introduced into the upper section by pipe 18 and removed by pipe 19. This gas is for the double purpose of heating the melt, and for removing therefrom, by combustion, the cokey material acquired in passage through the reaction zone. The reheated, purified melt then collects in pool 20, above the dividing plate 2, and flows down through pipe 12, for reuse in the reaction zone.

Thus it is seen that in essence the apparatus described above consists merely of a reaction vessel and a combined regeneration-heater, with one liquid, heat transfer medium circulating through both.

It is to be understood that where specific materials are named herein for use as melt or contact material, that they are used for exemplary purposes only, and that the invention must be understood as not being limited thereto or thereby, but as being subject only to such limitations as are expressed in the claims.

I claim:

1. The process of regenerating a contact mass in a conversion zone contaminated with carbonaceous residues by oxidation with a combustion supporting gas at temperatures above 350° C. which comprises passing the combustion supporting gas through the conversion zone packed with the contact mass, maintaining the desired temperature gradient therein by flowing an oxygen-insensitive liquid heat transfer medium through said zone in direct contact with said combustion supporting gas but in insufficient amount to flood the voids of the contact packing mass whereby the heat of oxidation is transferred to the heat transfer medium, removing the liquid heat transfer medium from the conversion zone, and restoring the removed heat transfer medium to proper temperature for reuse in the conversion zone by direct contact with a gas.

2. The process of regenerating a contact mass in a conversion zone contaminated with carbonaceous residues by oxidation with a combustion supporting gas at temperatures above 350° C. which comprises passing the combustion supporting gas through the conversion zone packed with the contact mass, maintaining the desired temperature gradient therein by flowing an oxygen-insensitive liquid heat transfer medium through said zone in direct contact with said combustion supporting gas but in insufficient amount to flood the voids of the contact packing mass whereby heat of oxidation is transferred to the heat transfer medium, removing the liquid heat transfer medium from the conversion zone, and restoring the removed heat transfer medium to proper temperature for reuse in the conversion zone.

ARMAND J. ABRAMS.